US009142968B2

(12) United States Patent
Ropp

(10) Patent No.: US 9,142,968 B2
(45) Date of Patent: Sep. 22, 2015

(54) SYSTEMS AND METHODS FOR ISLANDING DETECTION

(75) Inventor: Michael Ropp, Brookings, SD (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 291 days.

(21) Appl. No.: 13/103,721

(22) Filed: May 9, 2011

(65) Prior Publication Data
US 2011/0276192 A1 Nov. 10, 2011

Related U.S. Application Data

(60) Provisional application No. 61/332,674, filed on May 7, 2010, provisional application No. 61/363,634, filed on Jul. 12, 2010.

(51) Int. Cl.
*G06F 1/30* (2006.01)
*H02J 3/38* (2006.01)
*H02J 3/40* (2006.01)
*H02J 13/00* (2006.01)

(52) U.S. Cl.
CPC . *H02J 3/40* (2013.01); *H02J 3/383* (2013.01); *H02J 13/0006* (2013.01); *H02J 2003/388* (2013.01); *Y02E 10/563* (2013.01); *Y02E 40/72* (2013.01); *Y02E 60/723* (2013.01); *Y04S 10/123* (2013.01); *Y04S 10/16* (2013.01); *Y10T 307/729* (2015.04)

(58) Field of Classification Search
CPC ......... H02J 3/383; H02J 3/40; H02J 13/0006; H02J 2003/388; Y02E 10/563; Y04S 10/123; Y04S 10/16
USPC .......................................................... 700/293
See application file for complete search history.

(56) References Cited

U.S. PATENT DOCUMENTS 6,172,889 B1 1/2001 Eguchi et al.
6,339,538 B1 1/2002 Handleman
(Continued)

OTHER PUBLICATIONS

Mills-Price et al, "Solar Generation Control With Time-Synchronized Phasors" IEEE, Apr. 2011, pp. 160-167.*
(Continued)

Primary Examiner — Kenneth M Lo
Assistant Examiner — Olvin Lopez Alvarez
(74) Attorney, Agent, or Firm — Perkins Coie LLP

(57) ABSTRACT

A solar power inverter that detects islanding conditions includes a power generation component that generates alternating current (AC) from direct current produced by photovoltaic cells. The inverter generates AC for a load or an electrical power grid. The inverter also includes a component that generates synchrophasors from characteristics of electrically proximate AC. The inverter further includes a component that receives grid synchrophasors transmitted from a location on the electrical power grid (e.g., a transmission substation). The inverter further includes a controller that uses the inverter synchrophasors and the grid synchrophasors to calculate a degree of correlation between the electrical power grid AC frequency and the frequency of the electrically proximate AC. If the degree of correlation dips below a predefined value or exhibits certain patterns or behaviors that are indicative of a loss of mains (e.g., a loss of main power along the electrical power grid), the controller can cause the power generation component to stop generating AC or cause the inverter to intentionally island by electrically disconnecting from the electrical power grid.

27 Claims, 3 Drawing Sheets

(56) References Cited

U.S. PATENT DOCUMENTS

| | | | |
|---|---|---|---|
| 6,429,546 B1* | 8/2002 | Ropp et al. | 307/31 |
| 7,480,580 B2* | 1/2009 | Zweigle et al. | 702/106 |
| 7,502,696 B2* | 3/2009 | Moxley | 702/60 |
| 7,684,441 B2* | 3/2010 | Bickel et al. | 370/503 |
| 7,716,012 B2* | 5/2010 | Bickel | 702/179 |
| 8,024,390 B2* | 9/2011 | Bickel | 708/422 |
| 8,190,299 B2* | 5/2012 | Rovnyak et al. | 700/287 |
| 8,265,798 B2* | 9/2012 | Imes | 700/291 |
| 8,338,987 B2* | 12/2012 | O'Brien et al. | 307/82 |
| 2001/0048290 A1 | 12/2001 | Underwood et al. | |
| 2005/0190725 A1* | 9/2005 | Wakisaka et al. | 370/334 |
| 2006/0146582 A1 | 7/2006 | Lin et al. | |
| 2006/0250024 A1 | 11/2006 | Taylor | |
| 2007/0159866 A1* | 7/2007 | Siri | 363/95 |
| 2008/0204044 A1 | 8/2008 | Ponnaluri et al. | |
| 2009/0240644 A1* | 9/2009 | Boettcher et al. | 706/47 |
| 2010/0076613 A1* | 3/2010 | Imes | 700/287 |
| 2010/0125373 A1* | 5/2010 | Labuschagne et al. | 700/293 |
| 2010/0138057 A1* | 6/2010 | Curtin et al. | 700/286 |
| 2010/0145536 A1* | 6/2010 | Masters et al. | 700/292 |
| 2010/0292857 A1* | 11/2010 | Bose et al. | 700/292 |
| 2011/0184576 A1* | 7/2011 | Hasan et al. | 700/292 |
| 2012/0033473 A1* | 2/2012 | Scharf | 363/131 |
| 2012/0221265 A1* | 8/2012 | Arya et al. | 702/61 |
| 2012/0313490 A1* | 12/2012 | Schweitzer et al. | 310/68 B |
| 2012/0316691 A1* | 12/2012 | Boardman et al. | 700/293 |
| 2013/0264874 A1* | 10/2013 | Ropp | 307/51 |

OTHER PUBLICATIONS

Ropp et al, "Determining the Relative Effectiveness of Islanding Detection Methods Using Phase Criteria and Nondetection Zones", IEEE, Sep. 2000, pp. 290-296.*
Takei et al, "Phasor-based Monitoring System Employing Real-Time Ethernet ", Decemeber 15, 2007, pp. 8.*
Hung et al, "Automatic Phase-Shift Method for Islanding Detection of Grid-Connected Photovoltaic Inverters" IEEE, Mar. 2003, pp. 169-173.*
Guzman et al, "Real-Time Synchrophasor Applications in Power System Control and Protection", IEEE, Apr. 1, 2010, pp. 5.*
Schweitzer et al, "Real-World Synchrophasor Solutions", IEEE, Apr. 2009, pp. 12.*
Mynam et a, "islanding detection and adaptive load shedding", Sep. 30, 2009, pp. 2.*
Guzman et al, "Islanding detection for distributed Generation", Aug. 27, 2009, pp. 2.*
Wikipedia, "Pearson product-moment correlation coefficient", Feb. 10, 2010, pp. 9.*
Lane, "Computing Pearson's Correlation Coefficient", 2001, http://davidmlane.com/hyperstat/A51911.html, pp. 1.*
Ropp et al, "A Statistically-Based Method of Control of Distributed Photovoltaics Using Synchrophasors", IEEE, Jul. 2012 pp. 1-7.*
Paul et al, "Estimating Dynamic Instability Risk by Measuring Critical Slowing Down", Mar. 2011, pp. 1-5.*
Del Siegle, "Is there a relationship (difference) or isn't there a relationship (difference)?", 2009, pp. 2.*
Schweitzer et al, "Synchrophasor-Based Power System Protection and Control Applications", Apr. 1, 2010, pp. 10.*
Jiang et al, "Distributed State Estimator Utilizing Synchronized Phasor Measurements" May 2007, pp. 563-571.*
Viet et al, "Islanding Detection for Utility Interconnection of Multiple Distributed Generators", 2008, pp. 00557-000560.*
Doumbia et al, "Islanding Detection for Utility Interconnection of Multiple Distributed Generators", May 7, 2008, pp. 000557-000560.*
Lidula et al, "Fast and Reliable Detection of Power Islands Using Transient Signals", Dec. 31, 2009, pp. 493-498.*
Jeraputra et al, "An Improved Anti-Islanding Algorithm for Utility Interconnection of Multiple Distributed Fuel Cell Powered Generations", 2005, pp. 103-108.*
Lee et al, "Novel Islanding Detection Method for Distributed Generation", 2009, pp. 3378-3384.*
Yang et al, "A New Method for Islanding Detection of Utility connected Wind Power Generation Systems", 2005, pp. 1-6.*
Doumbia et al, "Improved Correlation Technique for Islanding Detection of Inverter Based Distributed Generation", 2008, pp. 2305-2310.*
Chang ", A Correlation Factor Based Islanding Detection Method for Distributed Synchronous Generators", 2008, pp. 1329-1338.*
Ropp et al, "Project Title: Assessment of the Universal Feasibility of Using Power System Harmonics as Loss of Mains Detection for Distributed Energy Resources", Nov. 28, 2012, pp. 46.*
Lasseter, Robert H., "CERTS Microgrid," IEEE International Conference on System of Systems Engineering, Apr. 2007, 5 pages.
Scharf, M. et al., "Laying the Foundation for the Grid-Tied Smart Inverter of the Future," White Paper, PV Powered, Apr., 2010, 14 pages.
International Search Report and Written Opinion; International Application No. PCT/US2011/035765; mailed Aug. 18, 2011; 12 pages.

* cited by examiner

SYSTEMS AND METHODS FOR ISLANDING DETECTION

CROSS REFERENCE TO RELATED APPLICATION

This application claims the benefit of U.S. Provisional Patent Application Nos. 61/332,674 filed on May 7, 2010, and 61/363,634 filed on Jul. 12, 2010, both of which are incorporated herein by reference in their entireties, and is related to the following concurrently filed patent applications: U.S. Pat. App. No. 61/363,632 filed on Jul. 12, 2010 (entitled SYSTEMS AND METHODS FOR DYNAMIC POWER COMPENSATION, SUCH AS DYNAMIC POWER COMPENSATION USING SYNCHROPHASORS); and U.S. Pat. App. No. 61/363,643 filed on Jul. 12, 2010 (entitled SYSTEMS AND METHODS FOR ELECTRICAL POWER GRID MONITORING USING LOOSELY SYNCHRONIZED PHASORS), each of which is also incorporated herein by reference in its entirety.

TECHNICAL FIELD

This application describes systems and methods for islanding detection.

BACKGROUND

A solar power inverter can be electrically connected to a local load (e.g., an industrial facility, a commercial building, a residential home, etc.) so as to provide electrical power to the local load. The local load is typically also connected to a utility grid and obtains electrical power that is generated by electrical power generators and that is transmitted across the utility grid. The solar power inverter can also supply electrical power to the utility grid. A portion of the utility grid between the solar power inverter and the electrical power generators may experience a disruption or other event (e.g., a switch opening, a line down, etc.) that results in the interruption of the flow of electrical power. In such an event, the solar power inverter and the local load become an island.

Certain electrical standards (e.g., UL 1741 and IEEE 1547) require solar power inverters to detect an islanding condition and disconnect (stop producing electrical power) within a certain period of time (e.g., two seconds). Such requirements stem at least partially from a need to protect line worker safety. Conventional solar power inverters can detect an islanding condition by using a technique involving two mechanisms. In the first mechanism, if the solar power inverter detects a change in utility grid frequency, the solar power inverter changes its frequency in such a way as to attempt to accentuate that utility grid frequency change. If the solar power inverter can affect the utility grid frequency, then an islanding condition has likely occurred. The second mechanism involves supplying reactive power pulses to the utility grid. If an islanding condition exists, the reactive power pulses will cause a perturbation that activates a positive feedback. Upon detecting an islanding condition, the solar power inverter is required to disconnect within the certain period of time.

DETAILED DESCRIPTION

1. Overview

Figure 1:
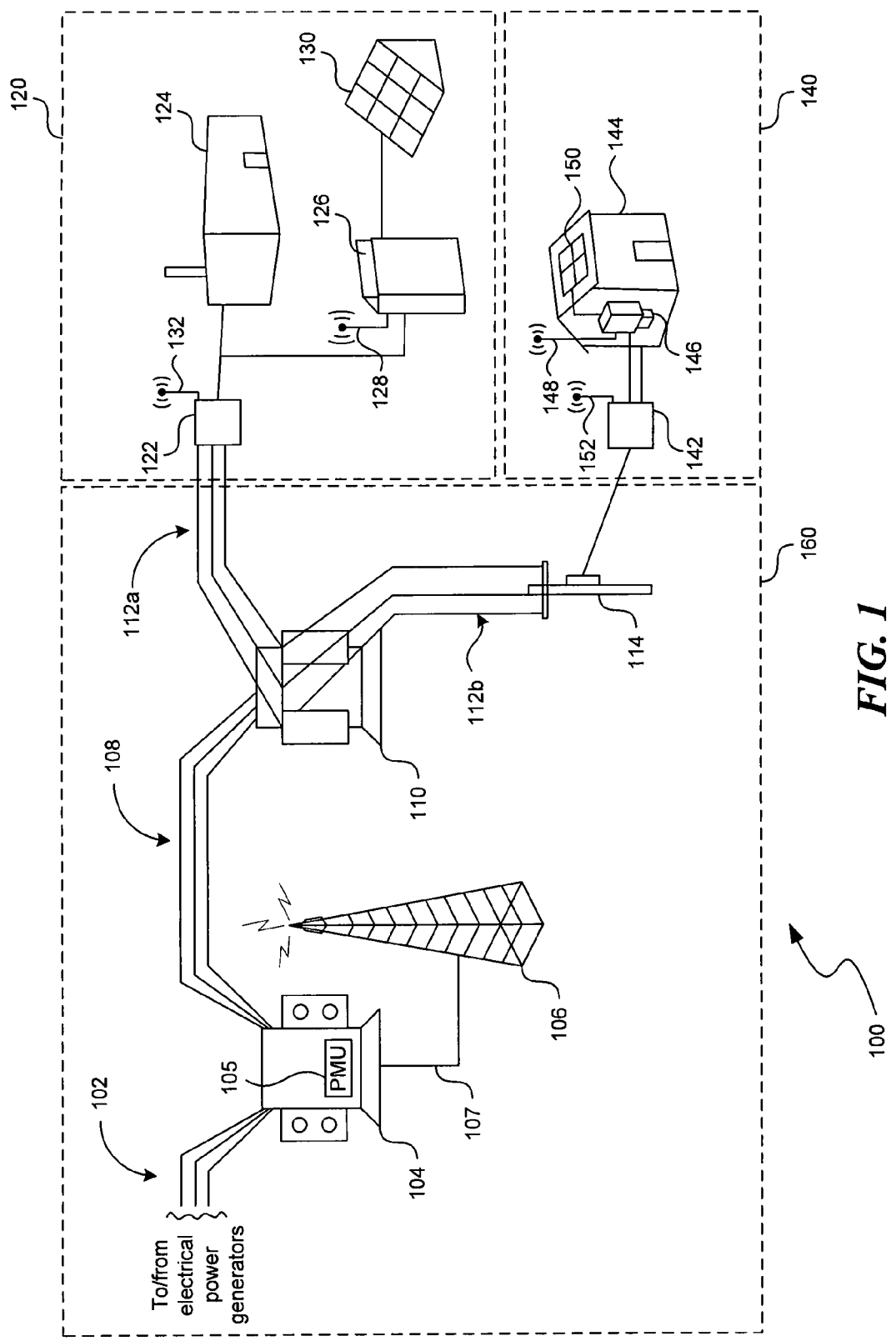
FIG. 1 is a diagram illustrating a system for islanding detection configured in accordance with an embodiment of the technology.

The inventor has recognized that conventional islanding detection techniques used by solar power inverters may have certain drawbacks. One drawback may be that if there are multiple solar power inverters, the reactive power pulses of the multiple solar power inverters may not be synchronized, thus decreasing the ability to detect islanding. Another drawback may be that if the solar power inverter is providing reactive power for purposes of detecting islanding conditions, the solar power inverter cannot provide reactive power for utility grid support services (e.g., providing volt-amperes reactive (VARs)). Another drawback may be that if the solar power inverter is sourcing VARs to the utility grid, the load and the power generated by the solar power inverter are likely to be closely matched. Such close matching may cause the solar power inverter to fail to detect islanding conditions. Accordingly, the need exists for systems and methods that overcome the above drawbacks, as well as provide additional benefits.

The present disclosure describes systems and methods for islanding detection. Certain details are set forth in the following description and in FIGS. 1-3 to provide a thorough understanding of various embodiments of the technology. Other details describing well-known aspects of solar power inverters, however, are not set forth in the following disclosure so as to avoid unnecessarily obscuring the description of the various embodiments.

Many of the details, dimensions, angles and other features shown in the Figures are merely illustrative of particular embodiments. Accordingly, other embodiments can have other details, dimensions, angles and features. In addition, further embodiments can be practiced without several of the details described below.

In the Figures, identical reference numbers identify identical, or at least generally similar, elements. To facilitate the discussion of any particular element, the most significant digit or digits of any reference number refer to the Figure in which that element is first introduced. For example, element 100 is first introduced and discussed with reference to FIG. 1.

In one embodiment, a solar power inverter includes a power generation component that generates alternating current from direct current produced by one or more photovoltaic cells to which the solar power inverter can be electrically connected. The solar power inverter also includes a data input/output component configured to receive synchrophasors generated at a point on a utility grid to which the solar power inverter can be electrically connected. The utility synchrophasors can be generated by a phasor measurement unit located at the point on the utility grid (e.g., at a transmission substation). The utility synchrophasors describe characteristics of the alternating current transmitted by the utility grid. A transmitter (e.g., a wireless transmitter) transmits the utility synchrophasors from the utility phasor measurement unit to the solar power inverter. The solar power inverter can also include a phasor measurement unit configured to generate inverter synchrophasors. The inverter synchrophasors describe characteristics of the alternating current generated by the power generation component or of alternating current at a point that is electrically proximate to the inverter (e.g., at the point of common coupling).

The solar power inverter also includes a controller that is coupled to the data input/output component and the phasor measurement unit. The controller is programmed to receive the utility synchrophasors from the data input/output component and the inverter synchrophasors from the phasor measurement unit. The controller uses the utility synchrophasors to determine a first set of frequency values for the utility alternating current and to use the inverter synchrophasors to determine a second set of frequency values for the inverter alternating current. Based upon these frequency values, the controller calculates a degree of correlation between the utility frequency and the inverter frequency. For example, in the event of an islanding condition, the calculated degree of correlation typically will be low. In such a case, the solar power inverter can either 1) cause the power generation component to stop producing alternating current or 2) intentionally island by electrically disconnecting the solar power inverter from the utility grid. In normal operation, the degree of correlation typically will be high (e.g., at or near unity), and the solar power inverter remains electrically connected to the utility grid.

In another embodiment, a system that enables islanding detection includes a processor and a computer-readable medium. The computer-readable medium has instructions stored thereon that, if executed by the processor, cause the processor to perform operations that enable islanding detection. The operations include receiving a first set of frequency values that each indicate a frequency of alternating current transmitted by a utility grid and receiving a second set of frequency values that each indicate a frequency of alternating current at a location electrically proximate to a power generation source electrically connected to the utility grid. The operations further include calculating a correlation coefficient based on the first and second sets of frequency values.

In a further embodiment, a method of calculating a correlation coefficient includes receiving a first set of frequency values, each of which indicate a frequency of alternating current transmitted by a utility grid, and receiving a second set of frequency values, each of which indicate a frequency of alternating current at a location electrically proximate to a power generation source electrically connected to the utility grid. The method further includes calculating a correlation coefficient based on the first and second sets of frequency values.

2. Systems and Methods for Islanding Detection

FIG. 1 is a diagram illustrating a system 100 for islanding detection configured in accordance with an embodiment of the technology. The system 100 includes a utility grid portion 160 and multiple customer premises portions 120 and 140. The utility grid portion 160 includes electrical power transmission lines 102 electrically connected to a transmission substation 104. The electrical power transmission lines carry three phase alternating current (AC) generated by one or more electrical power generators. The transmission substation 104 steps down the voltage of the AC (e.g., from 345 kilo Volts (kV) to 69 kV, or from any particular voltage to a lower voltage) before transmission of the AC over electrical power transmission lines 108 to a distribution substation 110. The distribution substation 110 further steps down the voltage of the AC (e.g., to 13.8 kV, or to any other voltage) prior to transmission over electrical transmission lines 112a to a first customer premises portion 120 and over electrical transmission lines 112b to a distribution device 114 and then to a second customer premises portion 140.

The transmission substation 104 includes a phasor measurement unit (PMU) 105. The PMU 105 measures characteristics of the AC at the transmission substation 104 and generates synchrophasors based on the measured characteristics of the AC. The PMU 105 includes a Global Positioning System (GPS) antenna that allows the PMU 105 to accurately timestamp the generated synchrophasors. The transmission substation 104 is networked via a communication channel 107 to a transceiver 106. The transceiver 106 receives the synchrophasors from the PMU 105 via the communication channel 107 and transmits the synchrophasors.

The first customer premises portion 120 includes an industrial load 124, one or more arrays 130 of photovoltaic cells, and an inverter 126. The arrays 130 produce direct current (DC) from solar irradiance and provide the DC to the inverter 126. The inverter 126 converts the DC into AC usable by the industrial load 124 or the utility grid. The inverter 126 is connected to a transceiver 128. As described in more detail herein, the transceiver 128 receives synchrophasors transmitted from the transceiver 106. The first customer premises portion 120 also includes a switch 122 at the border between the electrical power grid portion 160 and the first customer premises portion 120. The switch 122 includes a transceiver 132. The switch 122 can receive, via the transceiver 132, information transmitted by the transceiver 106 and/or the transceiver 128.

The second customer premises portion 140 includes a residential load 144, an array 150 of photovoltaic cells, and an inverter 146. The array 150 produces DC and provides the DC to the inverter 146, which converts the DC into AC usable by the residential load 144 or the utility grid. The inverter 146 is communicably coupled to a transceiver 148. As described in more detail herein, the transceiver 148 receives synchrophasors transmitted from the wireless device 106. The second customer premises portion 140 also includes a switch 142 at the border between the electrical power grid portion 160 and the second customer premises portion 140. The switch 142 includes a transceiver 152. The switch 142 can receive, via the transceiver 152, information transmitted by the transceiver 106 and/or the transceiver 148.

As illustrated in FIG. 1 the transceivers 106/128/132/148/152 are shown as wireless transmission and reception devices that transmit and receive information wirelessly. However, the transceivers 106/128/132/148/152 can be any suitable device for transmitting and receiving information over any suitable communication channel (e.g., a wireless network such as WiFi, WiMax, a cellular/GSM network, ZigBee, Advanced Metering Infrastructure (AMI), etc., a wired network such as a fiber network, an Ethernet network, etc., or any combination of wired and wireless networks). Accordingly, the techniques described herein are usable in conjunction with any suitable communication channel.

Figure 2:
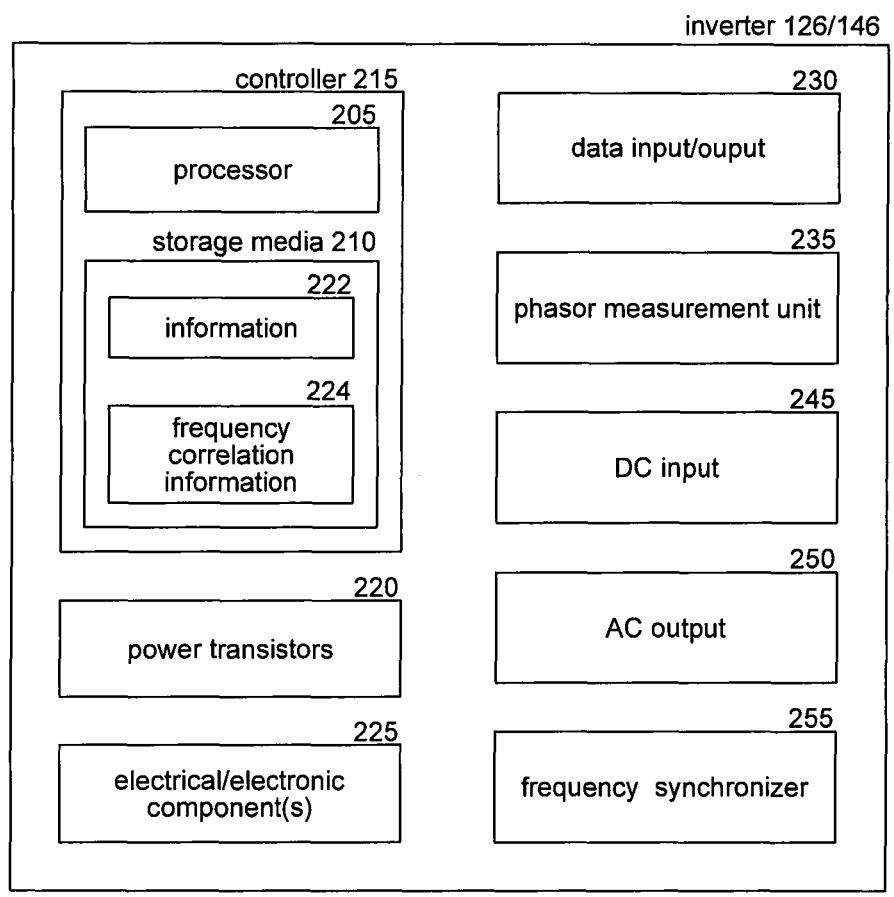
FIG. 2 is a block diagram illustrating components of a solar power inverter configured in accordance with an embodiment of the technology.

FIG. 2 is a block diagram illustrating components of the solar power inverter 126/146 configured in accordance with an embodiment of the technology. The solar power inverter 126/146 can also include components that are not illustrated in FIG. 2. The solar power inverter 126/146 includes a DC input component 245 that receives DC produced by the arrays 130/150. The solar power inverter 126/146 also includes power transistors 220, such as insulating gate bipolar transistors (IGBTs), which transform DC into AC for output by an AC output component 250. The solar power inverter 126/146 further includes various other electrical and/or electronic components 225, such as circuit boards, capacitors, transformers, inductors, electrical connectors, and/or other components that perform and/or enable performance of various functions associated with the conversion of DC into AC. The solar power inverter 126/146 also includes a data input/output component 230, which can include the transceiver 128/148 and/or other components that provide data input/output functionality and/or connection to a wired or wireless network (e.g., a modem, an Ethernet network card, Gigabit Ethernet network card, etc.).

The solar power inverter 126/146 further includes a frequency synchronizing component 255 that synchronizes a frequency of the AC produced by the power transistors 220 to a frequency of the electrical power grid. For example, the frequency synchronizing component 255 can synchronize to the electrical power grid using a phase-locked loop (PLL). The solar power inverter 126/146 further includes a PMU 235 that measures characteristics of the AC produced by the power transistors 220 and generates synchrophasors based on the measured characteristics. The PMU 235 includes a GPS antenna that allows the PMU to accurately timestamp the synchrophasors. The PMU 235 can measure the characteristics of the AC at a location electrically proximate to the generation of the AC (e.g., at the point of common coupling (PCC) to the electrical power grid). The PMU 235 can measure the characteristics of the AC at the electrically proximate location even if the inverter 126/146 is not generating AC. In some embodiments, the PMU 235 is not physically included in the inverter 126/146 but is at another location. In such embodiments, the PMU 235 measures the characteristics of the AC at such other location and transmits the measurements to the inverter 126/146.

The solar power inverter 126/146 further includes a controller 215, which includes a processor 205 and one or more storage media 210. For example, the controller 215 can include a control board having a digital signal processor (DSP) and associated storage media. As another example, the controller 215 can include a computing device (for example, a general purpose computing device) having a central processing unit (CPU) and associated storage media. The storage media 210 can be any available media that can be accessed by the processor 205 and can include both volatile and nonvolatile media, and removable and non-removable media. By way of example, and not limitation, the storage media 210 can include volatile and nonvolatile, removable and non-removable media implemented via a variety of suitable methods or technologies for storage of information. Storage media include, but are not limited to, RAM, ROM, EEPROM, flash memory or other memory technology, or any other medium (for example, magnetic disks) which can be used to store the desired information and which can accessed by the processor 205.

The storage media 210 stores information 212. The information 212 includes instructions, such as program modules, that are capable of being executed by the processor 205. Generally, program modules include routines, programs, objects, algorithms, components, data structures, and so forth, which perform particular tasks or implement particular abstract data types. The information 222 also includes data, such as values stored in memory registers, which can be accessed or otherwise used by the processor 205. The processor 205 can use the information 212 to perform various functions or cause various functions to be performed. The storage medium also stores frequency correlation information 214. As described in more detail herein, the processor 205 can use the frequency correlation information 224 to determine a degree of correlation between the frequency of the AC produced by the power transistors 220 of the solar power inverter 126/146 (the "inverter frequency") and the frequency of the AC of the electrical power grid (the "utility grid frequency"). The controller 215 can use the degree of correlation to determine, among other things, whether the solar power inverter 126/146 should stop producing AC or whether the solar power inverter should intentionally island.

While the solar power inverter 126/146 is electrically coupled to the electrical power grid, the inverter frequency and the electrical power grid frequency should be tightly correlated, particularly over longer averaging windows. However, when an island is formed due to, for example, a disruption experienced by the electrical power grid, the solar power inverter frequency and the electrical power grid frequency should become statistically uncorrelated.

Figure 3:
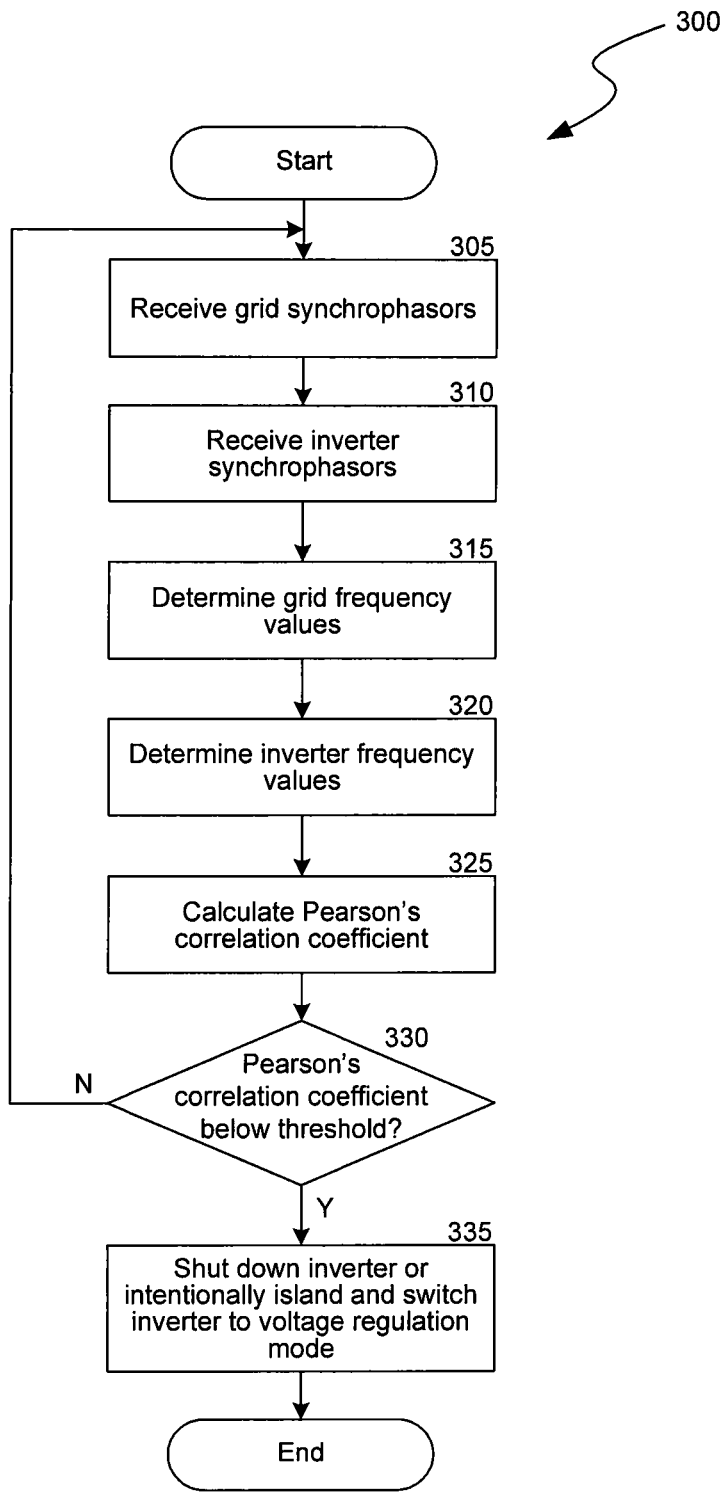
FIG. 3 is a flow diagram of a process for islanding detection configured in accordance with an embodiment of the technology.

FIG. 3 is a flow diagram of a process 300 for calculating a correlation coefficient that indicates a degree of correlation between the solar power inverter frequency and the electrical power grid frequency. The controller 215 can perform the process 300 to, among other things, detect an islanding condition. The process 300 is described as performed by the controller 215 of the solar power inverter 126/146. However, any suitable component of the solar power inverter 126/146 can perform the process 300. Additionally or alternatively, any suitable apparatus or system with appropriate hardware (e.g., central processing unit (CPU), etc.), firmware (e.g., logic embedded in microcontrollers, etc.), and/or software (e.g., stored in volatile or non-volatile memory) can perform the process 300. At the outset of the process 300, the solar power inverter 126/146 is electrically connected to the electrical power grid, which may be referred to herein as "grid-tied mode."

The process 300 begins at step 305, where the controller 215 receives synchrophasors received by the data input/output component 230 (e.g., synchrophasors transmitted by the transceiver 106). In FIG. 1, the transmission substation 104 includes the PMU 105 that generates synchrophasors that the transceiver 106 wirelessly broadcasts. Additionally or alternatively, other components of the utility grid portion 160 (e.g., the distribution substation 110, the distribution device 114, and/or electrical power generators) can include a PMU that generates synchrophasors that are broadcast (e.g., wirelessly or by another suitable communication channel) to the solar power inverter 126/146.

One advantage of wirelessly transmitting and receiving synchrophasors is that this can reduce the latency between the transmission and the reception of the synchrophasors. However, suitable communication channels other than wireless can be used to transmit and receive synchrophasors, such as fiber, Ethernet, and other suitable media. The PMU 105 can measure characteristics of the AC and generate synchrophasors at any suitable sampling rate, such as a sampling rate from approximately 5 Hz or more to approximately 80 Hz (e.g., approximately 5 samples per second to approximately 80 samples per second or more).

At step 310 the controller 215 receives the inverter synchrophasors that are generated by the PMU 235 based on measurements of characteristics of the AC generated by the power transistors 220. The PMU 235 can generate synchrophasors at the same sampling rate as the PMU 105. As previously noted, the synchrophasors generated by the PMU 105 of the transmission substation 104 and the PMU 235 of the inverter are GPS time-stamped. The timestamping allows the controller 215 to accurately associate a utility grid synchrophasor having a particular timestamp to an inverter synchrophasor having the same time stamp. In some embodiments, the inverter synchrophasor may be time stamped using another time reference as described in the previously-referenced U.S. Pat. App. No. 61/363,643 (entitled SYSTEMS AND METHODS FOR ELECTRICAL POWER GRID MONITORING USING LOOSELY SYNCHRONIZED PHASORS), At step 315 the controller 215 determines utility grid frequency values from the utility grid synchrophasors. The utility grid synchrophasors can include the utility grid frequency values, or the controller 215 can calculate the utility grid frequency values from the utility grid synchrophasors. At step 320 the controller 215 determines inverter frequency values from the inverter synchrophasors. The inverter synchrophasors can include the inverter frequency values, or the controller 215 can calculate the inverter frequency values from the inverter synchrophasors.

At step 325, the controller 215 calculates a Pearson's correlation coefficient using the utility grid frequency values and the inverter frequency values. In some embodiments, the controller 215 calculates the Pearson's correlation coefficient according to the following equation:

$$\hat{p} = \frac{n\sum xy - \sum x \sum y}{\sqrt{[n\sum x^2 - (\sum x)^2] \cdot [n\sum y^2 - (\sum y)^2]}}$$

In the above equation, x is the utility grid frequency value measured at a particular time, y is the inverter frequency value measured at the same time, and n is the total number of samples of the frequency measurements. The number of samples used may vary, such as from approximately five samples to approximately 200 samples or more.

At step 330, the controller 215 determines whether the Pearson's correlation coefficient is below a pre-defined threshold. In some embodiments, the pre-defined threshold falls in the range of from approximately 0.1 to approximately 0.7 (e.g., 0.5). If the Pearson's correlation coefficient is not below the pre-defined threshold, the process 300 returns to step 305. If the Pearson's correlation coefficient is below the pre-defined threshold, then the controller 215 has likely detected an islanding condition (e.g., a utility grid line down), and the process 300 continues to step 335.

At step 335, the controller 215 can cause the inverter 126/146 to perform one of two operations. The first operation is to shut the inverter 126/146 down (e.g., cause the power transistors 220 to stop producing AC). For example, in order to protect the safety of line workers that may need to correct a utility grid problem (e.g., to bring a utility grid line back up), the inverter 126/146 can shut down and stop producing AC.

A second operation is that the inverter 126/146 intentionally islands. In this situation, the controller 215 can send a signal that is transmitted via the inverter transceiver 128/148 to the switch transceiver 132/152 and that causes the switch 122/142 to open. The switch opening creates an open connection between the utility grid portion 160 and the customer premises portion 120/140. The controller 215 can also cause the inverter 126/146 to enter a voltage regulation mode. In voltage regulation mode, the inverter 126/146 attempts to keep the voltage of the local load 124/144 at a specified voltage, and supplies the necessary power to achieve that objective. One advantage of intentionally islanding is that the inverter 126/146 can provide power to the local load 124/144 while still electrically isolating itself from the utility grid portion 160, thus protecting line worker safety in the utility grid portion 160. After step 335 the process 300 concludes.

In some embodiments, in addition to or as an alternative to detecting that one or more consecutive calculated Pearson's correlation coefficients are below a certain threshold, the controller 215 uses multiple calculated Pearson's correlation coefficients over a period of time to determine that an islanding condition has likely occurred. For example, the controller 215 may detect that the Pearson's correlation coefficients dip below the threshold but then rises back above the threshold. In such a case, the controller 215 likely should not shut down or intentionally island. However, if the controller 215 detects that the Pearson's correlation coefficients dip below the threshold again within a period of time, the controller 215 has likely detected an islanding condition and should take or cause to be taken appropriate action. Accordingly, the controller 215 can examine a pattern of calculated Pearson's correlation coefficients over a period of time as a basis for determining that an islanding condition has likely occurred.

As another example, instead of or in addition to detecting that a calculated correlation coefficient has fallen below a pre-defined threshold to determine whether an islanding condition exists, the controller 215 can use pattern recognition techniques to detect patterns in correlation coefficients over time. Certain patterns may indicate that the utility grid is experiencing heavy loads and thus that the inverter 126/146 should remain in grid-tied mode and continue to source power to the utility grid. Other patterns may indicate that the utility grid has experienced a disruption and that an islanding condition exists, and therefore the inverter 126/146 should either shut down or intentionally island. Those of skill in the art will understand that the controller 215 may use the Pearson's correlation coefficients in various ways to intelligently detect islanding conditions and therefore enable the appropriate actions to be taken.

Those skilled in the art will appreciate that the steps shown in FIG. 3 may be altered in a variety of ways. For example, the order of the steps may be rearranged; substeps may be performed in parallel; shown steps may be omitted, or other steps may be included; etc.

One advantage of the techniques described herein is that because the controller 215 can detect an island only when the Pearson's correlation coefficient falls below a certain threshold, the solar power inverter can remain electrically connected to the utility grid when the Pearson's correlation coefficient is below unity but above the certain threshold. For example, the utility grid portion 160 may unexpectedly experience increased load, which can be due to loads switching on unexpectedly (e.g., multiple air conditioners turning on in the summer, industrial motors turning on, etc.). Such increased load without a corresponding increase in supply could potentially lead to brownout conditions. In such circumstances, it would be advantageous for the solar power inverter 126/146 to remain electrically connected to the utility grid portion 160 and to source power to the utility grid portion 160 and/or to local loads 124/144. Such circumstances could result in the calculated Pearson's correlation coefficient to drop below unity but still remain above the pre-defined threshold. In such a case, the inverter 126/146 can remain electrically connected to the utility grid portion 160 and continue to produce power to support the utility grid portion 160 and/or the local loads 124/144.

Another advantage of the techniques described herein is that multiple solar power inverters can each take frequency measurements (e.g., using synchrophasors). In the event that each solar power inverter is islanded, the solar power inverters can use the frequency measurements to connect islands without transient effects. Another advantage is that islanded solar power inverters can utilize frequency measurements for certain actions (e.g., to support local loads, to provide such frequency measurements to the utility grid, etc.).

Another advantage of several embodiments of the techniques described herein is that such techniques can enable the ability to ride-through utility grid conditions that would trip conventional anti-islanding techniques. Conventional anti-islanding techniques detect islanding conditions by detecting that voltage or current are outside of a specific range (e.g., above or below a certain range). As the penetration rate of solar power systems (and other renewable energy systems) on the utility grid increases, such out-of-range activity may occur more frequently. However, such out-of-range activity may not necessarily mean that the solar power systems is islanding. Accordingly, conventional anti-islanding techniques may lead to false positives and shut off, thus exacerbating utility grid conditions.

In contrast, the techniques described herein can account for such out-of-range activity without necessarily detecting an islanding condition. Solar power inverters (and other suitable systems) configured as described herein can ride-through such utility grid conditions without having to necessarily shut down. Accordingly, the techniques described herein can facilitate greater penetration of solar power systems (and other renewable energy systems) on the utility grid.

3. Reconnection to the Utility Grid

If the switch 122/142 has opened the inverter 126/146 is electrically disconnected from the electrical power grid. The inverter 126/146 and/or the switch 122/142 can detect when the utility voltage has come back up and stabilized in terms of amplitude and frequency, thereby indicating that the electrical power grid is no longer experiencing a disruption (e.g., a line down has been repaired). There will typically be a small difference in the inverter frequency and the grid frequency. If the sinusoid waves of the grid AC and the inverter AC are added, a classical interference pattern emerges. To reconnect, the inverter 126/146 and/or the switch 122/142 can wait for a node in the interference pattern to be zero and close the switch 122/142 at that point. The switch 122/142 can then signal the inverter 126/146 that a reconnection to the utility grid has been made and that the inverter 126/146 can return to grid-tied mode. In the event that there are multiple islands, similar techniques can be used to reclose a first island to a second island, thereby avoiding negative transient effects. In some embodiments, the inverter 126/146 can use techniques described in "CERTS MICROGRID," Lasseter, Robert, IEEE International Conference on System of Systems Engineering, 2007. (SoSE '07), the entirety of which is incorporated by reference herein.

4. Synchrophasor Source Identification

In FIG. 1, the transceiver 106 in the utility grid portion 160 broadcasts synchrophasors, and the transceivers 128/148 in the customer premises portions 120/140 receive the synchrophasors. The utility grid portion 160, the customer premises portions 120/140, as well as other customer premises portions can form a control area. A control area is a logical area for which a utility attempts to balance electrical power supply and demand for electrical power. In some embodiments, each control area includes a single PMU device and a single transceiver that broadcasts synchrophasors generated by the single PMU device.

However, logical control areas may geographically overlap or otherwise be geographically formed in such a way that a solar power inverter transceiver receives wireless synchrophasor broadcasts from a transmission substation transceiver in another control area. In such a case, the inverter can utilize such wireless synchrophasor broadcasts in addition to or as an alternative to using the wireless synchrophasor broadcasts from the transmission substation transceiver in the control area covering the inverter.

In some embodiments, each transmission substation PMU and/or transceiver has an identifier that uniquely identifies it amongst multiple transmission substation PMUs and/or transceivers. The transmission substation transceiver transmits the identifier with the synchrophasors, and the inverter transceivers receive the identifier with the synchrophasors. In such embodiments, the inverter can use the identifier to select which synchrophasors to use for correlation calculations. For example, the inverter can select only the synchrophasors identified as originating from the transmission substation transceiver in the control area covering the inverter.

To protect data security, the synchrophasors and/or identifiers can be encrypted so as to inhibit eavesdropping and/or other unauthorized or unwanted use of such data.

5. Conclusion

From the foregoing, it will be appreciated that specific, representative embodiments have been described herein for purposes of illustration, but that various modifications may be made to these embodiments. For example, although the process 300 is described as calculating the Pearson's correlation coefficient, correlation between the utility grid frequency and the solar power inverter frequency can be calculated using other techniques. As another example, although the process 300 is described as performed by an inverter controller, the process 300 can be performed by the switch 122/142, by a control system (e.g., by a supervisory control and data acquisition (SCADA) system), or by any suitable system and/or apparatus. As another example, the techniques described herein can be utilized by power generation sources other than solar power generation sources, such as wind power generators, hydro power generators, and/or other sources of electrical power that are electrically connected to the utility grid.

Additional embodiments are within the scope of the present disclosure. For example, methods of manufacturing and/or assembling solar power inverters and/or other apparatuses and systems in accordance with embodiments described herein are within the scope of the present disclosure. Further, while advantages associated with certain embodiments have been described in the context of those embodiments, other embodiments may also exhibit such advantages, and not all embodiments need necessarily exhibit such advantages to fall within the scope of the present disclosure. As another example, the elements of one embodiment can be combined with other embodiments in addition to or in lieu of the elements of other embodiments. Accordingly, the invention is not limited except as by the appended claims.

I claim:

1. A solar power inverter comprising:
   a direct current (DC) input component configured to receive DC produced by one or more photovoltaic cells;
   a power generation component configured to generate alternating current (AC) from the DC produced by one or more photovoltaic cells;
   an AC output component configured to output generated AC, wherein the AC output component is electrically coupleable to an electrical power grid;
   a data input/output component configured to receive signals indicating electrical power grid synchrophasors, wherein the electrical power grid synchrophasors describe characteristics of AC transmitted by the electrical power grid;
   a phasor measurement unit configured to generate inverter synchrophasors, wherein the inverter synchrophasors describe characteristics of AC electrically proximate to the AC output component; and
   a controller coupled to the data input/output component and the phasor measurement unit, wherein the controller is programmed to-receive the electrical power grid synchrophasors from the data input/output component;

receive the inverter synchrophasors from the phasor measurement unit;

based upon the electrical power grid synchrophasors, determine a first set of n frequency values for the AC transmitted by the electrical power grid;

based upon the inverter synchrophasors, determine a second set of n frequency values for the generated AC; and determine a correlation coefficient representing a measure of a statistical correlation between the set of n frequency values for the AC transmitted by the electrical power grid and the set of n frequency values for the generated AC;

wherein the correlation coefficient is determined by $$\hat{p} = \frac{n\Sigma xy - \Sigma x \Sigma y}{\sqrt{[n\Sigma x^2 - (\Sigma x)^2] \cdot [n\Sigma y^2 - (\Sigma y)^2]}}$$

where x is the electrical power grid frequency value measured at a particular time, v is the frequency of the generated AC measured at the same time, and n is the total number of samples in each set of the frequency measurements; and determining if the correlation coefficient falls below a threshold and if so, determining that an a islanding condition for the solar power inverter has occurred.

2. The solar power inverter of claim 1 wherein the controller is further programmed to:

cause the power generation component to stop generating AC upon determination that an islanding condition has occurred.

3. The solar power inverter of claim 1, wherein the AC output component is electrically coupleable to the electrical power grid through a switch positioned electrically between the AC output component and the electrical power grid, and wherein the controller is further programmed to:

detect that the correlation coefficient is below the pre-defined threshold; and transmit a signal indicating that the switch is to be opened.

4. The solar power inverter of claim 1, wherein the data input/output component is further configured to receive signals indicating electrical power grid synchrophasors from a transmitter communicably coupled to a phasor measurement unit that generates the electrical power grid synchrophasors.

5. The solar power inverter of claim 1 wherein the signals received by the data input/output component include an identifier of at least one of a source of the signals and a source of the electrical power grid synchrophasors.

6. the solar power inverter of claim 1, wherein the electrical power grid synchrophasors are time stamped and contain information about the frequency of the electrical alternating current at a substation on the electrical grid.

7. The solar power inverter of claim 1, wherein the number of frequency values n in the first and second sets is greater than 5.

8. An apparatus that enables islanding detection, the apparatus comprising:

a processor; and a computer-readable medium having instructions stored thereon that, if executed by the processor, cause the processor to perform operations comprising receiving a first set of n frequency values, wherein each of the n frequency values in the first set indicates a frequency x of alternating current (AC) transmitted by an electrical power grid;

receiving a second set of n frequency values, wherein each of the n frequency values in the second set indicates a frequency y of AC electrically proximate to a power generation source electrically connected to the electrical power grid; and calculating a correlation coefficient representing a measure of a statistical correlation between the first and second sets of n frequency values by $$\hat{p} = \frac{n\Sigma xy - \Sigma x \Sigma y}{\sqrt{[n\Sigma x^2 - (\Sigma x)^2] \cdot [n\Sigma y^2 - (\Sigma y)^2]}}.$$

where x is the electrical power grid frequency value measured at a particular time, y is the frequency of the generated AC measured at the same time, and n is the total number of samples in each set of frequency measurements; and detecting an islanding condition if the correlation coefficient is below a threshold amount.

9. The apparatus of claim 8 wherein the computer readable medium further includes instructions that if executed, cause the processor to perform operations comprising:

receiving a first set of synchrophasors, wherein each of the synchrophasors in the first set includes characteristics of the AC transmitted by the electrical power grid;

receiving a second set of synchrophasors, wherein each of the synchrophasors in the second set includes characteristics of the AC electrically proximate to the power generation source;

determining the first set of n frequency values from the first set of synchrophasors; and determining the second set of n frequency values from the second set of synchrophasors.

10. The apparatus of claim 8 wherein the computer readable medium includes instructions that when executed by the processor cause the processor to perform operations including disconnecting the power generation source from the electrical power grid if the correlation coefficient is below a pre-defined threshold value.

11. The apparatus of claim 8 wherein the computer readable medium further includes instructions that if executed, cause the processor to perform operations comprising:

detecting that the correlation coefficient is below a pre-defined threshold value; and transmitting a signal indicating that the power generation source is to stop generating AC.

12. The apparatus of claim 8 wherein the computer readable medium further includes instructions that if executed, cause the processor to perform operations comprising:

detecting that the correlation coefficient is below a value that indicates a loss of main power along the electrical power grid; and transmitting a signal indicating that the power generation source is to stop generating AC.

13. The apparatus of claim 8 wherein the computer readable medium further includes instructions that if executed, cause the processor to perform operations comprising:

detecting that the correlation coefficient is below a pre-defined threshold value; and transmitting a signal indicating that an electrical connection between the power generation source and the electrical power grid is to be opened.

14. The apparatus of claim 8 wherein the computer readable medium further includes instructions that if executed, cause the processor to perform operations comprising:
detecting that the correlation coefficient is below a threshold which indicates a loss of main power along the electrical power grid; and
transmitting a signal indicating that an electrical connection between the power generation source and the electrical power grid is to be opened.

15. The apparatus of claim 8 wherein the computer readable medium further includes instructions that if executed, cause the processor to perform operations comprising:
receiving a first set of synchrophasors transmitted by a transceiver, wherein each of the synchrophasors in the first set indicates characteristics of the AC transmitted by the electrical power grid, and
determining the first set of n frequency values from the first set of synchrophasors.

16. The apparatus of claim 8, wherein the first set of frequency values are encoded as a time stamped synchrophasors and indicate the frequency of the electrical alternating current on the power grid at a substation on the electrical power grid.

17. The apparatus of claim 8, wherein the number of frequency values n in the first and second sets is greater than 5.

18. A method of operating a computing system having a processor and a memory, to disconnect a power generation source from an electrical power grid, the method comprising:
receiving a first set of n frequency values, wherein each frequency value x in the first set indicates a frequency of alternating current (AC) transmitted by an electrical power grid;
receiving a second set of n frequency values, wherein each frequency value y in the second set indicates a frequency of AC electrically proximate to a power generation source electrically connected to the electrical power grid;
calculating, by the computing system, correlation coefficient representing a measure of a statistical correlation between the first and second sets of frequency values by $$\hat{p} = \frac{n\Sigma xy - \Sigma x \Sigma y}{\sqrt{[n\Sigma x^2 - (\Sigma x)^2] \cdot [n\Sigma y^2 - (\Sigma y)^2]}}.$$

where x is the electrical power grid frequency value measured at a particular time, y is the frequency of the generated AC measured at the same time, and n is the total number of samples in each set of frequency measurements; and
generating a signal to disconnect the power generation source from the electrical power grid if the correlation coefficient falls below a threshold value.

19. The method of claim 18, further comprising:
receiving a first set of synchrophasors, wherein each of the synchrophasors in the first set includes characteristics of the AC transmitted by the electrical power grid;
receiving a second set of synchrophasors, wherein each of the synchrophasors in the second set includes characteristics of the AC electrically proximate to the power generation source;
determining the first set of n frequency values from the first set of synchrophasors; and
determining the second set of n frequency values from the second set of synchrophasors.

20. The method of claim 18 wherein the power generation source remains electrically connected to the electrical power grid as long as the correlation coefficient is above a pre-defined threshold number.

21. The method of claim 18, further comprising:
detecting that the correlation coefficient is below a pre-defined threshold value; and
transmitting a signal indicating that the power generation source is to stop generating alternating current.

22. The method of claim 18, further comprising:
detecting that the correlation coefficient is below a threshold that indicates a loss of main power along the electrical power grid; and
transmitting a signal indicating that the power generation source is to stop generating alternating current.

23. The method of claim 18, further comprising:
detecting that the correlation coefficient is below a threshold that indicates a loss of main power along the electrical power grid; and
transmitting a signal indicating that an electrical connection between the power generation source and the electrical power grid is to be opened.

24. A system for islanding detection, the system comprising:
means for receiving a first set of synchrophasors, each of the first set of synchrophasors describing characteristics of alternating current (AC) transmitted by an electrical power grid;
means for generating a second set of synchrophasors, each of the second set of synchrophasors describing characteristics of AC electrically proximate to a power generation source electrically connected to the electrical power grid; and
means for determining, based upon the first and second sets of synchrophasors, n samples of a frequency x of the AC transmitted by the electrical power grid and n samples of a frequency y of the AC generated by the power generation source; and
means for calculating a correlation coefficient $\hat{p}$ representing a statistical correlation of the n samples of the frequency of the AC transmitted by the electrical power grid and the n samples of the frequency of the AC generated by the power generation source by;

$$\hat{p} = \frac{n\Sigma xy - \Sigma x \Sigma y}{\sqrt{[n\Sigma x^2 - (\Sigma x)^2] \cdot [n\Sigma y^2 - (\Sigma y)^2]}}.$$

and
means for detecting an islanding condition if the correlation coefficient falls below a pre-defined value.

25. The system of claim 24, further comprising means for transmitting a signal indicating that the power generation source is to stop generating alternating current in response to a determination that the correlation coefficient falls below a threshold that indicates a loss of main power along the electrical power grid.

26. The system of claim 24, further comprising means for transmitting a signal indicating that an electrical connection between the power generation source and the electrical power grid is to be opened in response to a determination that the correlation coefficient is below a pre-defined value.

27. The system of claim 24, wherein the means for receiving the first set of synchrophasors includes means for receiving a wireless signal indicating the first set of synchrophasors.

* * * * *